(12) United States Patent
Lee et al.

(10) Patent No.: US 8,682,318 B2
(45) Date of Patent: Mar. 25, 2014

(54) METHOD OF PERFORMING RANDOM ACCESS AFTER APPLYING BACK-OFF

(75) Inventors: Young Dae Lee, Anyang-si (KR); Sung Jun Park, Anyang-si (KR); Seung June Yi, Anyang-si (KR); Sung Duck Chun, Anyang-Si (KR)

(73) Assignee: LG Electronics Inc., Seoul (KR)

( * ) Notice: Subject to any disclaimer, the term of this patent is extended or adjusted under 35 U.S.C. 154(b) by 697 days.

(21) Appl. No.: 12/364,793

(22) Filed: Feb. 3, 2009

(65) Prior Publication Data

US 2009/0209248 A1    Aug. 20, 2009

Related U.S. Application Data

(60) Provisional application No. 61/026,119, filed on Feb. 4, 2008.

(30) Foreign Application Priority Data

Jan. 22, 2009   (KR) .................. 10-2009-0005440

(51) Int. Cl.
*H04W 4/00*    (2009.01)

(52) U.S. Cl.
USPC ........ 455/434; 455/435.1; 455/453; 455/423; 455/450

(58) Field of Classification Search
USPC .................. 455/434, 435.1, 453, 450
See application file for complete search history.

(56) References Cited

U.S. PATENT DOCUMENTS

| 7,406,098 B2 * | 7/2008 | Taneja et al. ................. 370/468 |
| 7,522,535 B2 * | 4/2009 | Guillouard et al. ........... 370/252 |
| 2007/0230600 A1 * | 10/2007 | Bertrand et al. ............... 375/260 |
| 2008/0273478 A1 * | 11/2008 | Budde et al. .................. 370/311 |

* cited by examiner

*Primary Examiner* — Wayne Cai
*Assistant Examiner* — Chuck Huynh
(74) *Attorney, Agent, or Firm* — Birch, Stewart, Kolasch & Birch, LLP (57) ABSTRACT

A random access procedure in a radio communication system is provided. The method of performing random access in a radio communication system includes transmitting a random access preamble using a predetermined parameter value, delaying retransmission of the random access preamble if the random access fails, initializing the predetermined parameter value if a delay time is more than a specific threshold value, and retransmitting the random access preamble using the initialized parameter value.

4 Claims, 10 Drawing Sheets

(a) Control-plane protocol stack (b) User-plane protocol stack

METHOD OF PERFORMING RANDOM ACCESS AFTER APPLYING BACK-OFF

This application claims the benefit of the U.S. Provisional Application No. 61/026,119, filed on Feb. 4, 2008, which is hereby incorporated by reference as if fully set forth herein.

This application claims the benefit of the Korean Patent Application No. 10-2009-0005440, filed on Jan. 22, 2009, which is hereby incorporated by reference as if fully set forth herein.

BACKGROUND OF THE INVENTION

1. Field of the Invention

The present invention relates to a radio communication system, and more particularly, to a random access procedure in a radio communication system.

2. Discussion of the Related Art

An enhanced universal mobile telecommunication system (E-UMTS) is an evolved version of a UMTS and basic standardization thereof is in progress under the 3$^{rd}$ generation partnership project (3GPP). For details of the technical specifications of the UMTS and the E-UMTS, refer to Release 7 and Release 8 of "3$^{rd}$ Generation Partnership Project; Technical Specification Group Radio Access Network", respectively.

Figure 1:
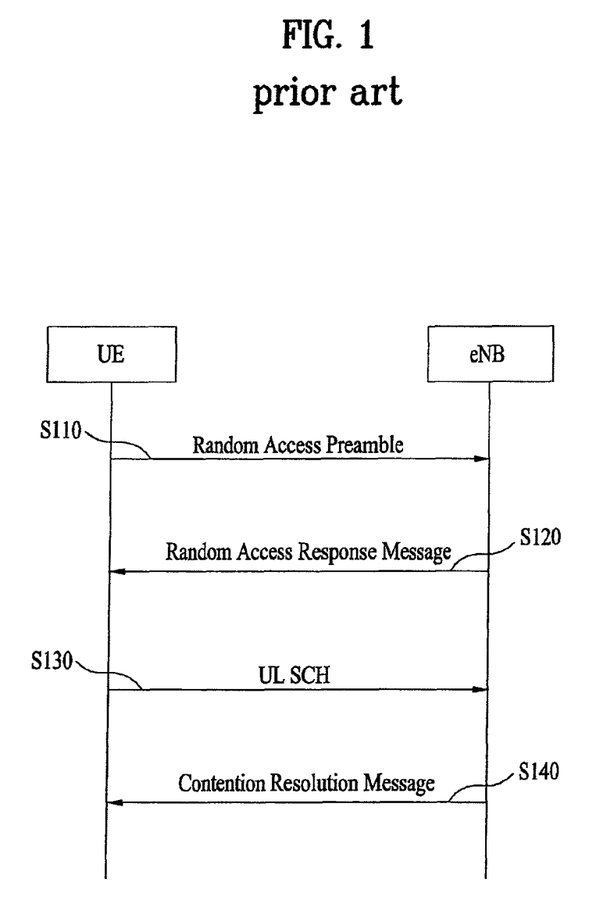
FIG. 1 is a view showing an example of a method of performing a random access procedure.

FIG. 1 is a view showing a random access procedure.

The random access procedure is used to transmit short-length data in uplink. For example, the random access procedure is performed upon initial access in an RRC idle mode, upon initial access after radio link failure, upon handover requiring the random access procedure, and upon the occurrence of uplink/downlink data requiring the random access procedure during an RRC connected mode. Some RRC messages such as an RRC connection request message, a cell update message, and an URA update message are transmitted using a random access procedure. Logical channels such as a Common Control Channel (CCCH), a Dedicated Control Channel (DCCH), or a Dedicated Traffic Channel (DTCH) can be mapped to a transport channel (RACH). The transport channel (RACH) can be mapped to a physical channel (e.g., Physical Random Access Channel (PRACH)). When a UE MAC layer instructs a UE physical layer to transmit a PRACH, the UE physical layer first selects an access slot and a signature and transmits a PRACH preamble in uplink. The random access procedure is divided into a contention-based procedure and a non-contention-based procedure.

Referring to FIG. 1, the UE receives and stores information about random access from an enode B (eNB) via system information (SI). Thereafter, if the random access is necessary, the UE transmits a random access preamble (also called a message 1) to the eNB (S110). When the eNB receives the random access preamble from the UE, the eNB transmits a random access response message (also called a message 2) to the UE (S120). In detail, downlink scheduling information for the random access response message may be CRC masked with a random access-random network temporary identifier (RA-RNTI) and may be transmitted on an L1/L2 control channel (physical downlink control channel; PDCCH). Thereafter, the UE checks whether or not random access response information associated with the UE is present in the random access response message. It may be checked whether or not the random access response information associated with the UE is present, by checking whether or not a random access preamble ID (RAID) for the preamble transmitted by the UE is present. The random access response information includes a timing advance (TA) indicating timing offset information for synchronization, radio resource allocation information used in uplink, a temporary identifier (e.g., T-CRNTI) for identifying the UE, and so on. When the UE receives the random access response information, the UE transmits an uplink message (also called a message 3) via an uplink shared channel (SCH) according to the radio resource allocation information included in the response information (S130). The eNB transmits a contention resolution message (also called a message 4) to the UE (S140) after receiving the uplink message from the UE.

If the random access of the UE fails in the above procedure, the UE may apply back-off. The back-off indicates that the UE delays the access for a certain time or a specific time. If the access is performed immediately after the random access fails, a probability that the random access fails again due to an identical or similar cause is high. Accordingly, when the random access fails, the access is delayed for a predetermined time. Thus, it is possible to prevent the waste of a radio resource due to failure or increase a probability that the random access is successfully performed.

Figure 2:
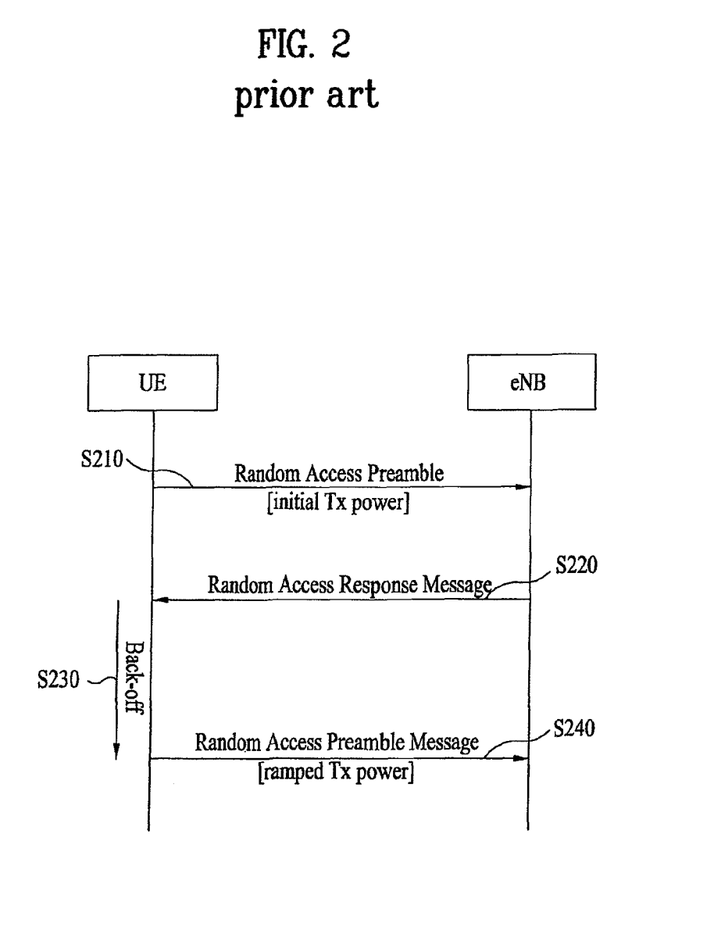
FIG. 2 is a view showing a method of performing random access after applying back-off.

FIG. 2 is a view showing a method of performing random access after applying back-off.

Referring to FIG. 2, a UE transmits a random access preamble using a parameter for random access in uplink. The parameter for the random access may be updated according to the number of continuous failures of the random access. The parameter includes transmission power (Tx power) for transmitting the random access preamble. For convenience, the Tx power for the transmitting the preamble is used as a representative example of the parameter. In this case, the UE uses initial Tx power with respect to the random access preamble which is initially transmitted (S210).

Thereafter, the UE receives a random access response message for the random access preamble from an eNB (S220). The random access response message may include a back-off parameter value for applying back-off. In this case, the UE stores the back-off parameter value obtained from the random access response message. Thereafter, if the random access procedure fails due to a certain cause, the UE may apply the back-off according to the back-off parameter value (S230). Since the random access procedure fails, the UE updates the parameter value for the random access and then retransmits the random access preamble. In this case, the UE retransmits the random access preamble using the Tx power increased by a ramping step (S240).

Although the random access procedure fails after the UE receives the random access response message in FIG. 2, this is only exemplary and the random access procedure may fail due to various causes. The detailed example thereof will be described with reference to FIG. 3.

Figure 3:
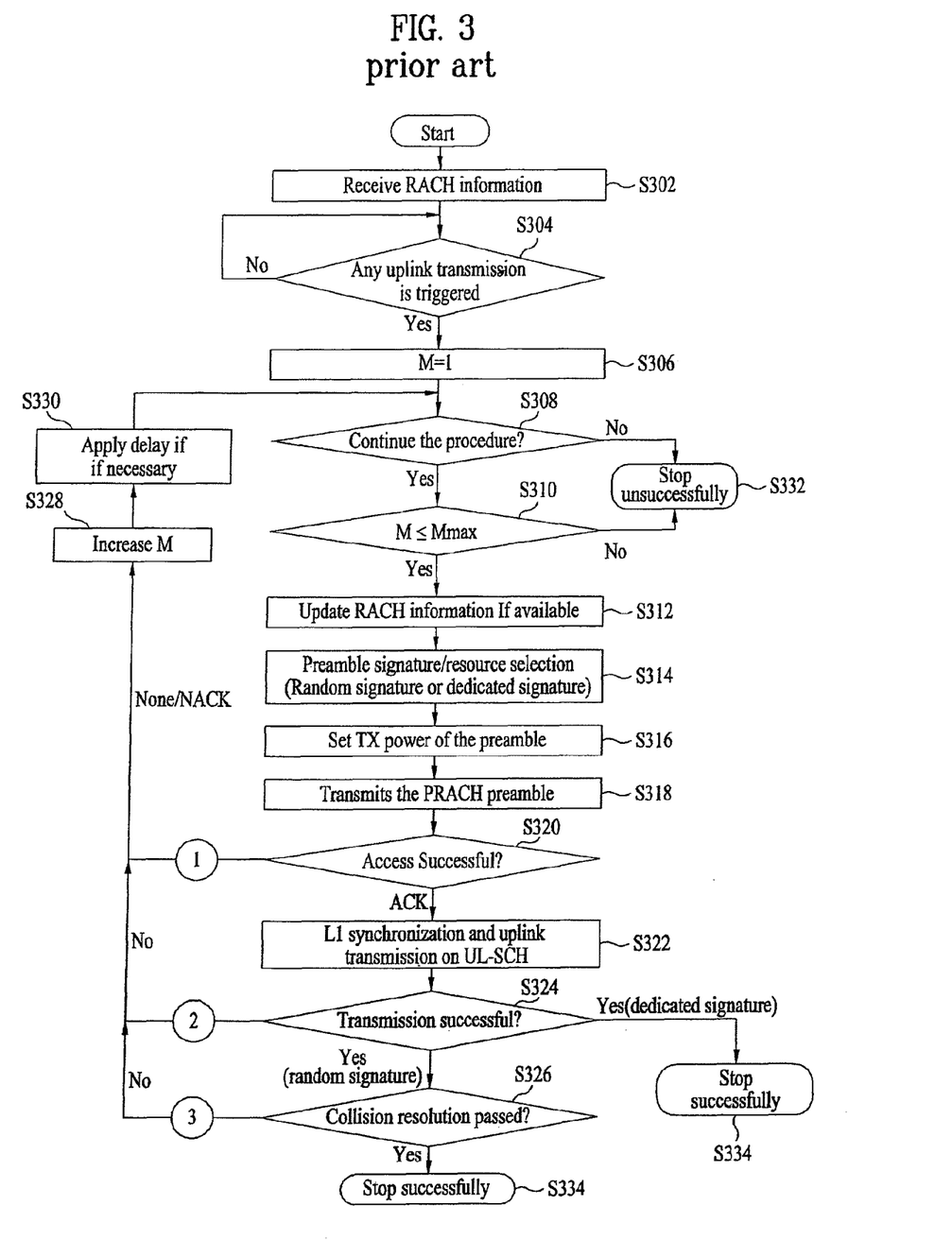
FIG. 3 is a flowchart illustrating a random access procedure.

FIG. 3 is a flowchart illustrating a random access procedure.

Referring to FIG. 3, a UE receives RACH information (S302). The UE performs the random access procedure as follows if a separate uplink transport channel is not present (S304).

The UE initializes a random access preamble counter M to 1 (S306). Thereafter, the UE determines whether or not the random access procedure is performed (S308). If it is determined that the random access procedure is continuously performed, then it is checked whether the value of M is equal to or less than an allowed maximum value Mmax (S310). If the value of M exceeds the allowed maximum value, the UE finishes the random access procedure (S332). If not so, the UE continuously performs the random access procedure. The UE updates the RACH information if necessary (S312), and selects a preamble signature/resource (S314). Thereafter, the UE sets the Tx power of the preamble (S316) and transmits a PRACH preamble to an eNB (S318). Although not shown in the drawing, the ramping of the Tx power of the preamble may be performed according to the value of M. That is, the Tx power of the preamble transmitted at a specific time point may be "initial Tx power+ramping step×(M−1)".

After the preamble is transmitted, the UE checks whether or not the initial access procedure using the preamble is successful while an L1/L2 control region is monitored, in order to receive a random access response message during a specific time (S320). When the UE does not receive a downlink scheduling signal masked with an RA-RNTI during the specific time, the initial access procedure fails. In addition, although the downlink scheduling signal masked with the RA-RNTI is received and the random access response message is decoded, if the contents associated with the UE are not included in the random access response message, the initial access procedure fails. The UE increases M by 1 and may apply back-off (①, S330).

When the random access response message is successfully received, the UE adjusts a transmission timing using the information obtained from the random access response and transmits an uplink message on an uplink SCH (S322). If the uplink message is not normally received by the eNB, the UE increases M by 1 (S328) and may apply the back-off (②, S330).

If the uplink message is normally transmitted to the eNB, the eNB transmits a contention resolution message to the UE in downlink. Thereafter, if the contention resolution procedure is passed, the UE finishes the random access procedure. In contrast, if the contention resolution procedure is not passed, the UE increases M by 1 (S328) and may apply the back-off if necessary (③, S330).

Thereafter, the UE performs the random access procedure again from the step S308.

In the related art, if the random access procedure fails, the UE retransmits the preamble with the Tx power ramped from the existing preamble Tx power after selectively applying the back-off. However, if the length of the back-off is long, a wireless environment may be changed. In such a case, if the power ramping is performed from the existing preamble Tx power, the Tx power may be improper. Accordingly, the Tx power of the UE may not be efficiently managed.

SUMMARY OF THE INVENTION

Accordingly, the present invention is directed to a method of performing random access after applying back-off that substantially obviates one or more problems due to limitations and disadvantages of the related art.

An object of the present invention is to provide a method of efficiently managing uplink transmission (Tx) power in a radio communication system.

Another object of the present invention is to provide a method of efficiently managing an uplink Tx power in a random access procedure.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of performing random access in a radio communication system includes transmitting a random access preamble using a predetermined parameter value; delaying retransmission of the random access preamble if the random access fails; initializing the predetermined parameter value if a delay time is more than a specific threshold value; and retransmitting the random access preamble using the initialized parameter value.

The predetermined parameter may include a parameter associated with transmission power of the random access preamble. The predetermined parameter may include a preamble transmission counter.

The method may further include receiving the specific threshold value. The specific threshold value may be UE-specific or UE-common.

In another aspect of the present invention, a method of performing random access in a radio communication system includes transmitting a random access preamble using a predetermined parameter value; delaying retransmission of the random access preamble if the random access fails; selectively performing the update or the initialization of the predetermined parameter value in consideration of a delay time; and retransmitting the random access preamble using the updated or initialized parameter value.

The predetermined parameter may include a parameter associated with transmission power of the random access preamble. The predetermined parameter may include a preamble transmission counter. The update of the predetermined parameter value may include increasing the predetermined parameter value by one step.

The update of the predetermined parameter value may be performed if the delay time exceeds a specific threshold value. The initialization of the predetermined parameter value may be performed if the delay time is equal to or less than the specific threshold value. The method may further include receiving the specific threshold value. The specific threshold value may be UE-specific or UE-common.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. In the following embodiments, the technical features of the present invention are applied to an evolved universal mobile telecommunication system (E-UMTS).

The E-UMTS system is an evolved version of the conventional WCDMA UMTS system and basic standardization thereof is in progress under the 3rd Generation Partnership Project (3GPP). The E-UMTS is also referred to as a Long Term Evolution (LTE) system. For details of the technical specifications of the UMTS and E-UMTS, refer to Release 7 and Release 8 of "3rd Generation Partnership Project; Technical Specification Group Radio Access Network".

The E-UMTS mainly includes a User Equipment (UE), a base station (or eNB or eNode B), and an Access Gateway (AG) which is located at an end of a network (E-UTRAN) and which is connected to an external network. Generally, an eNB can simultaneously transmit multiple data streams for a broadcast service, a multicast service and/or a unicast service. The AG can be divided into a part that handles processing of user traffic and a part that handles control traffic. Here, the AG part for processing new user traffic and the AG part for processing control traffic can communicate with each other using a new interface. One or more cells may exist for one eNB. An interface for transmitting user traffic or control traffic can be used between eNBs. A Core Network (CN) may include the AG and a network node or the like for user registration of the UE. An interface for discriminating between the E-UTRAN and the CN can be used. The AG manages mobility of a UE on a Tracking Area (TA) basis. One TA includes a plurality of cells. When the UE has moved from a specific TA to another TA, the UE notifies the AG that the TA where the UE is located has been changed.

Figure 4:
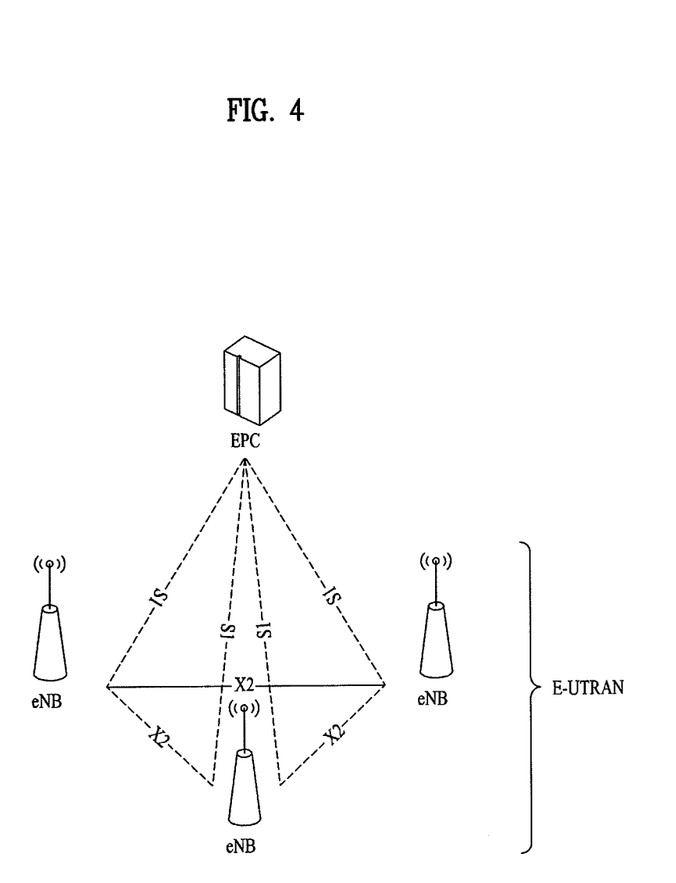
FIG. 4 is a view showing the schematic configuration of an evolved universal terrestrial radio access network (E-UTRAN)

FIG. 4 illustrates a network structure of an Evolved Universal Terrestrial Radio Access Network (E-UTRAN) system which is a mobile communication system to which the embodiment of the present invention is applied. The E-UTRAN system is an evolved version of the conventional UTRAN system. The E-UTRAN includes a base station that will also be referred to as "eNode B" or "eNB". The eNBs are connected through an X2 interface. Each eNB is connected to the User Equipment (UE) through a radio interface and is connected to an Evolved Packet Core (EPC) through a S1 interface.

Figure 5:
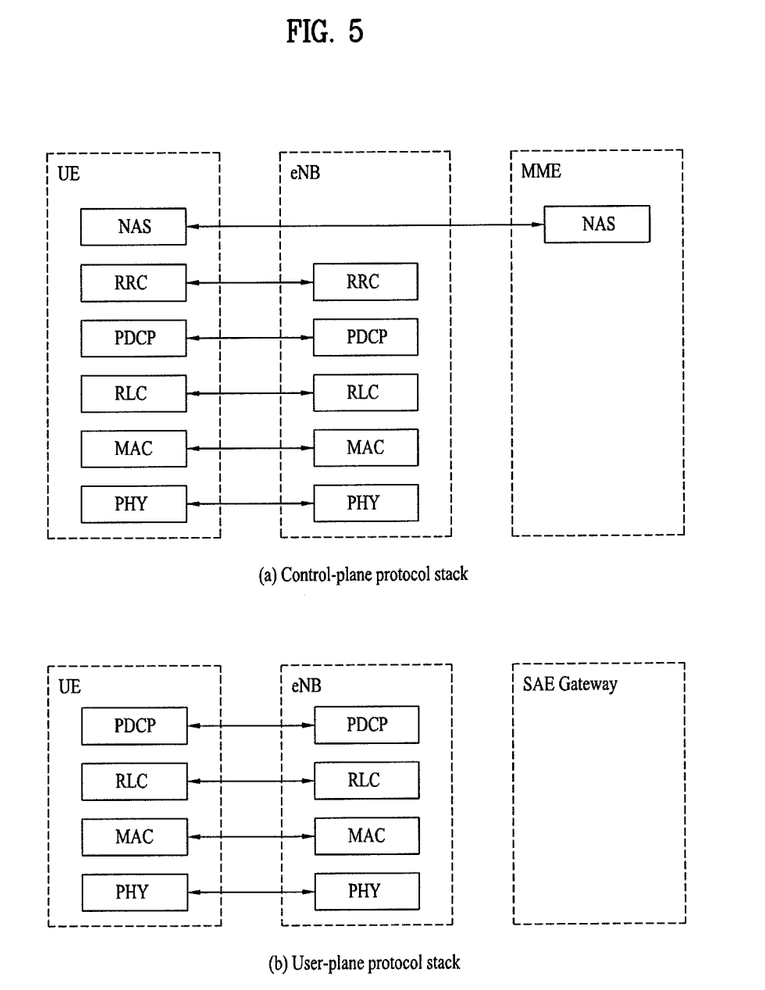
FIG. 5 is a view showing a radio interface protocol structure between a user equipment (UE) and the E-UTRAN.

FIG. 5 illustrates the configurations of a control plane and a user plane of a radio interface protocol between a UE and a UMTS Terrestrial Radio Access Network (UTRAN) based on the 3GPP radio access network standard. The radio interface protocol is divided horizontally into a physical layer, a data link layer and a network layer, and vertically into a user plane for data transmission and a control plane for signaling. The protocol layers of FIG. 5 can be divided into a L1 layer (first layer), a L2 layer (second layer) and a L3 layer (third layer) based on the lower three layers of the Open System Interconnection (OSI) reference model widely known in communication systems.

The control plane is a passage through which control messages that a UE and a network use in order to manage calls are transmitted. The user plane is a passage through which data (e.g., voice data or Internet packet data) generated at an application layer is transmitted. The following is a detailed description of the layers of the control and user planes in a radio interface protocol.

The physical layer, which is the first layer, provides an information transfer service to an upper layer using a physical channel. The physical layer is connected to a Media Access Control (MAC) layer, located above the physical layer, through a transport channel. Data is transferred between the MAC layer and the physical layer through the transport channel. Data transfer between different physical layers, specifically between the respective physical layers of transmitting and receiving sides, is performed through the physical channel. The physical channel is modulated according to the Orthogonal Frequency Division Multiplexing (OFDM) method, using time and frequencies as radio resources.

The MAC layer of the second layer provides a service to a Radio Link Control (RLC) layer, located above the MAC layer, through a logical channel. The RLC layer of the second layer supports data transmission with reliability. The functions of the RLC layer may also be implemented through internal functional blocks of the MAC layer. In this case, the RLC layer need not be existed. A PDCP layer of the second layer performs a header compression function to reduce unnecessary control information in order to efficiently transmit IP packets such as IPv4 or IPv6 packets in a radio interface with a relatively narrow bandwidth.

A Radio Resource Control (RRC) layer located at the lowermost of the third layer is defined only in the control plane and is responsible for control of logical, transport, and physical channels in association with configuration, re-configuration and release of Radio Bearers (RBs). The RB is a service that the second layer provides for data communication between the UE and the UTRAN. To accomplish this, the RRC layer of the UE and the RRC layer of the network exchange RRC messages. The UE is in RRC connected mode if RRC connection has been established between the RRC layer of the radio network and the RRC layer of the UE. Otherwise, the UE is in RRC idle mode.

A Non-Access Stratum (NAS) layer located above the RRC layer performs functions such as session management and mobility management.

One cell of the eNB is set to use a bandwidth such as 1.25, 2.5, 5, 10 or 20 MHz to provide a downlink or uplink transmission service to UEs. Here, different cells may be set to use different bandwidths.

Downlink transport channels for transmission of data from the network to the UE include a Broadcast Channel (BCH) for transmission of system information, a Paging Channel (PCH) for transmission of paging messages and a downlink Shared Channel (SCH) for transmission of user traffic or control messages. User traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages.

Logical channels, which are located above the transport channels and are mapped to the transport channels, include a Broadcast Control Channel (BCCH), a Paging Control Channel (PCCH), a Common Control Channel (CCCH), a Multicast Control Channel (MCCH) and a Multicast Traffic Channel (MTCH).

Figure 6:
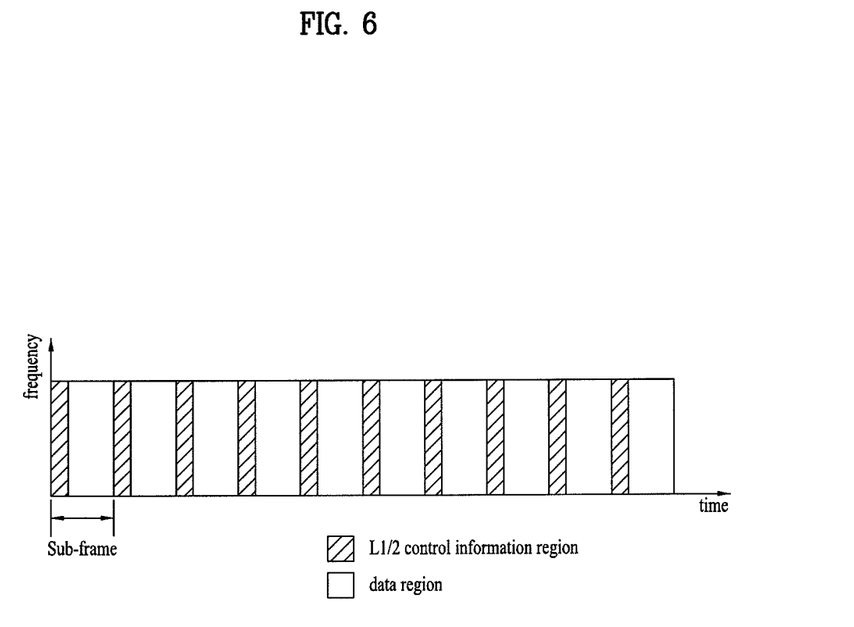
FIG. 6 is a view showing an example of a physical channel structure used in an evolved universal mobile telecommunication system (E-UMTS)

FIG. 6 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 6, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Embodiment

Figure 7:
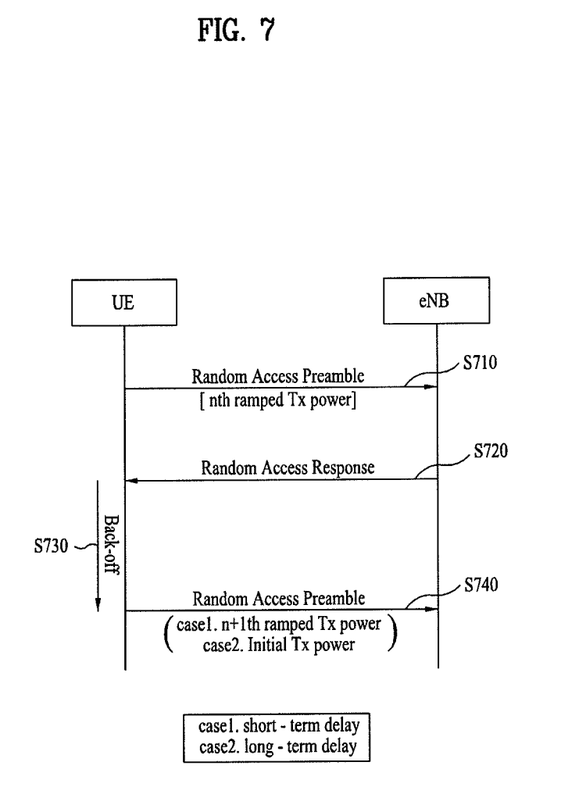
FIG. 7 is a view showing an example of a method of performing access again according to an embodiment of the present invention if a random access procedure fails.

Update or Initialization of Random Access Parameter in Consideration of Delay Time FIG. 7 is a view showing an example of a method of performing access again according to an embodiment of the present invention if a random access procedure fails.

Referring to FIG. 7, a user equipment (UE) generates a preamble using a parameter for the random access. The parameter for the random access includes transmission (Tx) power of the preamble or a parameter associated with the setup of the Tx power. The parameter for the random access includes a number of preamble transmission (e.g. PREAMBLE_TRANSMISSION_COUNTER) and preamble Tx power (e.g. PREAMBLE_RECEIVED_TARGET_POWER). The preamble Tx power (e.g. PREAMBLE_RECEIVED_TARGET_POWER) may be set by the following equations.

PREAMBLE_RECEIVED_TARGET_POWER=PREAMBLE_INITIAL_RECEIVED_TARGET_POWER+(PREAMBLE_TRANSMISSION_COUNTER−1)×POWER_RAMP_STEP   Equation 1

PREAMBLE_RECEIVED_TARGET_POWER=PREAMBLE_INITIAL_RECEIVED_TARGET_POWER+DELTA_PREAMBLE+(PREAMBLE_TRANSMISSION_COUNTER−1)×POWER_RAMP_STEP   Equation 2

In the above equations, the PREAMBLE_INITIAL_RECEIVED_TARGET_POWER indicates the initial Tx power of the preamble, POWER_RAMP_STEP indicates a power-ramping factor, DELTA_PREAMBLE indicates an offset according to a preamble format.

As for the PREAMBLE_INITIAL_RECEIVED_TARGET_POWER and the POWER_RAMP_STEP, their values are received from an eNode B (eNB) and stored for usage. The PREAMBLE_TRANSMISSION_COUNTER is increased one by one after the random access preamble is transmitted, and an initial value thereof is 1. The DELTA_PREAMBLE may be set according to the preamble format and may have a negative value, 0 or a positive value. For example, the DELTA_PREAMBLE may have a value of −3 dB, 0 dB or 8 dB.

The UE transmits the preamble including a random access preamble ID (RAID) to the eNB using the above-computed value. In FIG. 7, it is assumed that the random access preamble is continuously retransmitted due to the consecutive failures of the random access process. The UE transmits the random access preamble using $n^{th}$ ramped Tx power in uplink (S710).

Thereafter, the UE receives a random access response message from the eNB in a response to the random access preamble (S720). As one of examples that the random access procedure fails, if the UE does not receive an acknowledgement (ACK) response for the random access preamble, the UE may apply back-off using a back-off parameter obtained from the random access preamble. If the UE does not receive the random access response message, the UE may apply the back-off using a default back-off parameter. As such, the UE delays the retransmission of the random access preamble by a time indicated by the back-off parameter. For example, the back-off parameter may be as follows.

TABLE 1

| Index | Back-off parameter value (ms) |
|---|---|
| 0 | 1 |
| 1 | 10 |
| 2 | 20 |
| 3 | 30 |
| 4 | 40 |
| 5 | 60 |
| 6 | 80 |
| 7 | 120 |
| 8 | 160 |
| 9 | 240 |
| 10 | 320 |
| 11 | 480 |
| 12 | 960 |

The UE transmits the random access preamble in uplink after applying the back-off, in order to perform the random access (S740). In this case, if the delay time due to the back-off exceeds a specific threshold value, the UE initializes the parameter for the random access. Preferably, the UE initializes the parameter associated with the setup of the power of the preamble. If not so, the UE updates the parameter associated with the setup of the power of the preamble.

In detail, if the delay time due to the back-off exceeds the specific threshold value, the UE initializes PREAMBLE_TRANSMISSION_COUNTER. In contrast, if the delay time due to the back-off is equal to or less than the specific threshold value, the UE increases PREAMBLE_TRANSMISSION_COUNTER by 1 without initialization. Thereafter, the UE computes the preamble Tx power PREAMBLE_RECEIVED_TARGET_POWER using Equation 1 or 2 again. The UE transmits the random access preamble using the computed preamble Tx power PREAMBLE_RECEIVED_TARGET_POWER.

The specific threshold value may be properly set in consideration of a wireless environment and the power efficiency of the UE. For example, if a radio channel is slowly changed due to the mobility of the UE or a regional characteristic, it may be preferable that the specific threshold value is set to be high, in view of the power efficiency. In contrast, if the radio channel is rapidly changed, it may be preferable that the specific threshold value is set to be low and the power ramping is less performed, in view of the power efficiency. The specific threshold value may be received from a network. This will be described in detail with reference to FIGS. 10 and 11.

Figure 8:
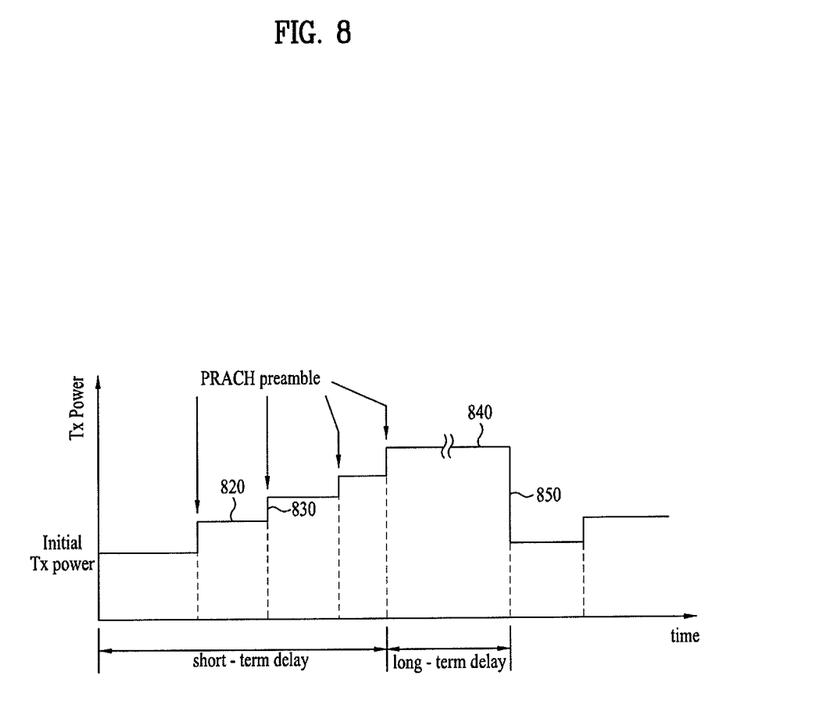
FIG. 8 is a view showing a variation in preamble transmission (Tx) power when the random access is performed according to the embodiment of the present invention.

FIG. 8 is a view showing a variation in preamble transmission (Tx) power when the random access is performed according to the embodiment of the present invention. In the drawing, a horizontal axis denotes a time and a vertical axis denotes the level of the Tx power of the preamble.

Referring to FIG. 8, a UE transmits a random access preamble in uplink with initial Tx power in order to perform a random access procedure. Thereafter, the random access procedure fails due to any reason and the UE applies back-off. That is, the UE delays the retransmission of the random access preamble. For example, the delay time due to the back-off may be 0 ms, 10 ms, 20 ms, 30 ms, 40 ms, 60 ms, 80 ms, 120 ms, 160 ms, 240 ms, 320 ms, 480 ms or 960 ms.

If the delay time due to the back-off is short (short-term delay 820), the UE updates the parameter value for the random access. The update of the parameter value includes increasing the parameter value for setting the preamble Tx power by one step. In detail, the update of the parameter value includes increasing the preamble transmission counter by 1. In this case, the preamble Tx power may be set by Equation 1 or 2 and the preamble Tx power may be increased by the ramping step (830).

In contrast, if the delay time due to the back-off is long (long-term delay 840), the UE initializes the parameter value for the random access. The initialization of the parameter includes initialization of the parameter value for setting the preamble Tx power. In detail, the initialization of the parameter value includes setting the preamble transmission counter to 1. In this case, the preamble Tx power may be set by Equation 1 or 2 and the preamble Tx power may start from the initial Tx power again (850).

Figure 9:
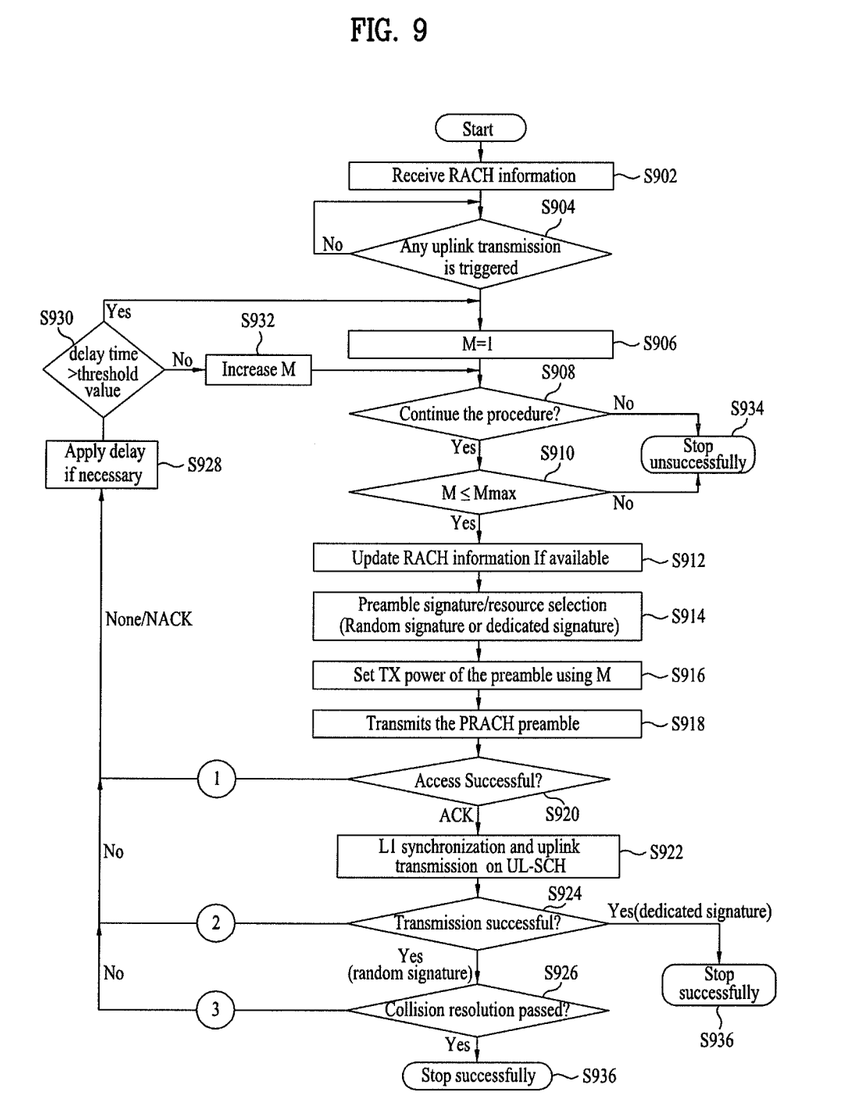
FIG. 9 is a flowchart illustrating a random access procedure according to an embodiment of the present invention.

FIG. 9 is a flowchart illustrating a random access procedure according to an embodiment of the present invention.

Referring to FIG. 9, a UE receives RACH information (S902). The UE performs the random access procedure as follows if a separate uplink transport channel is not present (S904).

The UE initializes a random access preamble counter M to 1 (S906). Thereafter, the UE determines whether or not the random access procedure will be performed (S908). If it is determined that the random access procedure will be continuously performed, then it is checked whether the value of M is equal to or less than an allowed maximum value Mmax (S910). If the value of M exceeds the allowed maximum value, the UE stops the random access procedure (S934). If not so, the UE continuously performs the random access procedure. The UE updates the RACH information if available (S912) and selects a preamble signature/resource (S914). Thereafter, the UE sets the preamble Tx power using the value of M (S916). The preamble Tx power may be set by the method expressed by Equation 1 or 2. The UE transmits a PRACH preamble to an eNB using the Tx power set using the value of M (S918).

The UE checks whether or not the initial access procedure using the preamble is successful, while monitoring the L1/L2 control region, after transmitting the preamble, in order to receive a random access response message during a specific time (S920). For example, the UE does not receive a downlink scheduling signal masked with an RA-RNTI during the specific time, the random access procedure fails. In addition, although the downlink scheduling signal masked with the RA-RNTI is received and the random access response message is decoded, if the contents associated with the UE are not present in the random access response message, the random access procedure fails (①). If the random access response message is successfully received, the UE adjusts a transmission timing using information obtained from the random access response and transmits an uplink message on the uplink SCH (S922). If the transmitted uplink message is not normally received by the eNB, the random access procedure fails (②). If the uplink message is normally transmitted to the UE, the eNB transmits a contention resolution message to the UE in downlink. Thereafter, if the contention resolution is passed, the UE stops the random access procedure. In contrast, if the contention resolution is not passed, the random access procedure fails (③).

If the random access procedure fails (①, ② and ③), the UE applies back-off if necessary (S928). If the back-off is applied, the UE delays the retransmission of the preamble according to the back-off parameter and checks whether or not the delay time due to the back-off is higher than a specific threshold value (S930). If the delay time is higher than the specific threshold value, the value of M is initialized to 1 (S906) and, if not so, the value of M is increased by 1 (S932). That is, if the transmission delay of the random access preamble due to the back-off is long (long-term delay), the parameter value for the random access is initialized and, if the transmission delay is short (short-term delay), the parameter value for the random access is updated in consideration of the preamble transmission counter.

Although FIG. 9 shows the comparison between the delay time due to the back-off and the specific threshold value, the reference and the meaning of the delay time may be variously modified according to implementation examples. For example, a reference time point of the delay time may be a previous preamble transmission time point. In this case, calculating the delay time from the previous preamble transmission time point may be easily implemented by operating a timer in the step S918. In addition, the step S930 of comparing the delay time with the specific threshold value may be variously modified according to the implementation examples. That is, in FIG. 9, the start time point and the end time point for computing the delay time are only exemplary and may be variously modified according to the implementation examples.

In the above-described embodiment, it is important that the power of the UE can be efficiently managed by selectively initializing the parameter for the random access in consideration of the delay time from the previous random access procedure, when the random access is performed again.

Figure 10:
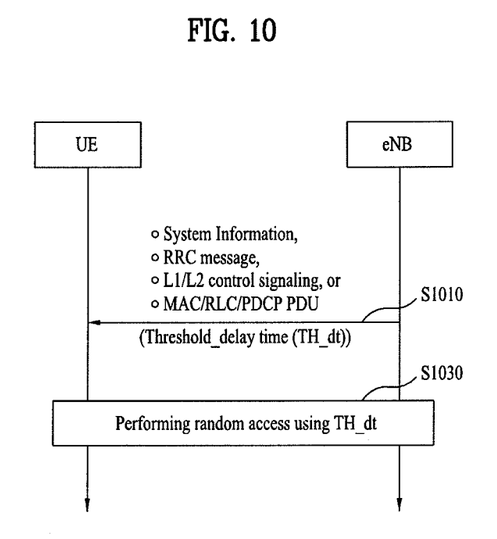
FIG. 10 is a view showing an example of the transmission of a specific threshold value to a UE in association with the method of performing the random access procedure according to the embodiment of the present invention.

FIG. 10 is a view showing an example of the transmission of a specific threshold value to a UE in association with the method of performing the random access procedure according to the embodiment of the present invention.

The threshold value may be delivered from a network to the UE via system information (SI), an RRC message, L1/L2 control signaling (e.g., PDCCH), a MAC/RLC/PDCP PDU or the like. The RRC signal may be a signal associated with RRC connection release, RRC connection request, RRC connection setup, radio bearer setup, radio bearer reconfiguration, RRC connection reconfiguration or RRC connection re-establishment. The threshold value may be UE-common or UE-specific. For example, the threshold value may be broadcasted to all UEs in the cell via the SI. In addition, the threshold value may be delivered to a specific UE via an RRC connection release message.

The threshold value may be periodically/non-periodically provided by the network. In addition, the threshold value may become invalid. For example, if the threshold value is UE-common and if the PLMN, the registered area, the tracking area (TA), the cell, the group or the RAT is changed, the threshold value may become invalid. In addition, if the threshold value is UE-specific, the threshold value may become invalid while the UE transits from an idle mode to a connected mode. That is, the threshold value may become invalid by a certain RRC signal for moving the UE from the idle mode to the connected mode. For example, the threshold value may become invalid when the UE sends the RRC connection request, when the RRC connection setup is received from the eNB or when the RRC connection complete is sent to the eNB. Alternatively, the threshold value may become invalid while the UE transits from the connected mode to the idle mode. That is, the threshold value may become invalid by a certain RRC signal for moving the UE from the connected mode to the idle mode. For example, the threshold value may become invalid by the RRC connection release. In addition, when a predetermined time elapses after the UE receives the threshold value, the threshold value may become invalid.

Figure 11:
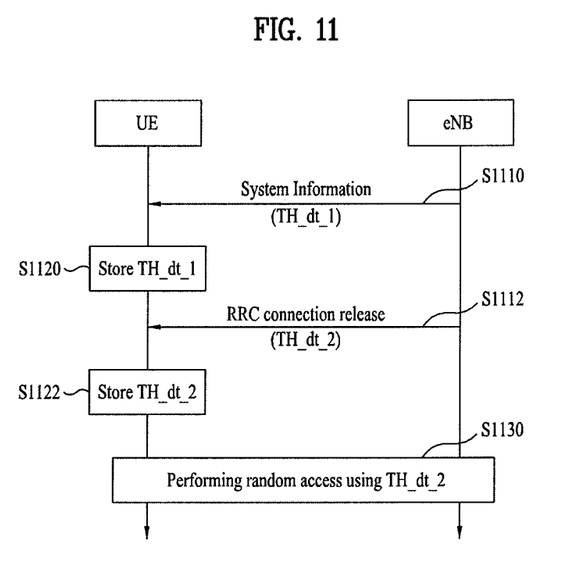
FIG. 11 is a view showing a method of performing the random access when two or more threshold values are received, according to an embodiment of the present invention.

FIG. 11 is a view showing a method of performing the random access when two or more threshold values are received, according to the embodiment of the present invention. The UE may repeatedly receive the threshold value from a network. In this case, the threshold value may be different or equal. When the UE repeatedly receives the threshold value, the UE may apply a UE-specific threshold value more preferentially than a UE-common threshold value. In addition, the UE may more preferentially apply a threshold value received by a certain method than a threshold value received by another method.

Referring to FIG. 11, the UE may receive a threshold value via SI (S1110) and receive a threshold value via the RRC connection release (S1112). In this case, the UE may ignore the threshold value received from the SI and perform the random access using the threshold value received via the RRC connection release (S1120, S1122 and S1130). Thereafter, the UE in the idle mode may be RRC-connected to the eNB in order to receive a service from the eNB, and the threshold value received via the RRC connection release may become invalid. In addition, if the threshold value is not received from the network at RRC connection release after the UE receives the service from the eNB, the UE returned to the idle mode may perform the random access procedure using the previous threshold value before the RRC connection or perform the random access procedure using the threshold value which is newly received from the SI.

The above-described embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary.

The above-mentioned embodiments of the present invention are disclosed on the basis of a data communication relationship between a base station and a mobile station. In this case, the base station is used as a terminal node of a network via which the base station can directly communicate with the mobile station. Specific operations to be conducted by the base station in the present invention may also be conducted by an upper node of the base station as necessary. In other words, it will be obvious to those skilled in the art that various operations for enabling the base station to communicate with the mobile station in a network composed of several network nodes including the base station will be conducted by the base station or other network nodes other than the base station. The term "Base Station" may be replaced with a fixed station, Node-B, eNode-B (eNB), or an access point as necessary. The term "mobile station" may also be replaced with a user equipment (UE), a mobile station (MS) or a mobile subscriber station (MSS) as necessary.

The embodiments of the present invention can be implemented by a variety of means, for example, hardware, firmware, software, or a combination of them. In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software codes may be stored in a memory unit so that it can be driven by a processor. The memory unit is located inside or outside of the processor, so that it can communicate with the aforementioned processor via a variety of well-known parts.

The embodiments of the present invention have the following effects.

First, it is possible to efficiently manage uplink transmission power in a radio communication system.

Second, it is possible to efficiently manage uplink transmission power in a random access procedure.

The present invention is applicable to a radio communication system and, more particularly, a random access procedure of a radio communication system.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A method of performing random access at a user equipment in a radio communication system, the method comprising:
   transmitting a first random access preamble using a first parameter value;
   performing a back-off to delay transmitting a second random access preamble for a back off time when the random access fails;
   checking if the back off time exceeds a specific threshold value to determine whether to update the first parameter value or not;
   updating the first parameter value to obtain a second parameter value if the back off time does not exceed the specific threshold value;
   transmitting the second random access preamble using the first parameter value when the back off time does exceed the specific threshold value such that a transmission power of the second random access preamble is determined using the first parameter value; and
   transmitting the second random access preamble using the second parameter value when the back off time does not exceed the specific threshold value such that the transmission power of the second random access preamble is determined using the second parameter value.

2. The method according to claim 1, further comprising:
   receiving the specific threshold value through at least one of a radio resource control (RRC) message, a physical downlink control channel (PDCCH) and a protocol data unit (PDU).

3. The method according to claim 1, wherein the specific threshold value is UE-specific or UE-common.

4. A device configured to perform random access in a radio communication system, the device comprising:
   a transmitter; and
   a controller operatively connected to the transmitter, the controller configured to transmit a first random access preamble using a first parameter value,
      perform a back-off to delay transmitting a second random access preamble for a back off time when the random access fails,
      check if the back off time exceeds a specific threshold value to determine whether to update the first parameter value or not,
      if the back off time does not exceed the specific threshold value, update the first parameter value to obtain a second parameter value,
      transmit the second random access preamble using the first parameter value when the back off time does exceed the specific threshold value such that a transmission power of the second random access preamble is determined using the first parameter value, and
      transmit the second random access preamble using the second parameter value when the back off time does not exceed the specific threshold value such that the transmission power of the second random access preamble is determined using the second parameter value.

* * * * *